United States Patent [19]

Baumann

[11] Patent Number: 5,743,590
[45] Date of Patent: Apr. 28, 1998

[54] FRONT END FOR AN AUTOMOBILE WITH A SUPPORTING STRUCTURE

[75] Inventor: Karl-Heinz Baumann, Bondorf, Germany

[73] Assignee: Mercedes-Benz AG, Stuttgart, Germany

[21] Appl. No.: 754,008

[22] Filed: Nov. 20, 1996

[30] Foreign Application Priority Data

Nov. 20, 1995 [DE] Germany ............... 195 43 193.6

[51] Int. Cl.⁶ ...................... B62D 21/00; B62D 25/08
[52] U.S. Cl. ............... 296/194; 296/198; 296/204
[58] Field of Search ........................... 296/194, 203, 296/204, 198

[56] References Cited

U.S. PATENT DOCUMENTS

| | | | |
|---|---|---|---|
| 4,560,198 | 12/1985 | Katano et al. | 296/185 |
| 4,723,811 | 2/1988 | Harasaki | 296/294 |
| 4,763,948 | 8/1988 | Harasaki | 296/194 |
| 4,919,474 | 4/1990 | Adachi et al. | 296/194 |
| 4,955,663 | 9/1990 | Imura | 296/194 |

FOREIGN PATENT DOCUMENTS

| | | | |
|---|---|---|---|
| 187433 | 10/1953 | Austria. | |
| 0253989 | 5/1987 | European Pat. Off. | 296/194 |
| 964469 | 5/1957 | Germany | 296/198 |
| 2144383 | 3/1972 | Germany | 296/198 |
| 2426050C2 | 1/1975 | Germany. | |
| 2944538A1 | 6/1980 | Germany. | |
| 285316A5 | 12/1990 | Germany. | |
| 777551 | 6/1957 | Italy | 296/198 |
| 59-171760 | 9/1984 | Japan | 296/198 |
| 1-36583 | 2/1989 | Japan | 296/198 |
| 1-182178 | 7/1989 | Japan | 296/194 |
| 1311990 | 5/1987 | U.S.S.R. | 296/198 |
| 2073107 | 10/1981 | United Kingdom | 296/198 |
| 2153751 | 6/1985 | United Kingdom | 296/198 |

*Primary Examiner*—Joseph D. Pape
*Attorney, Agent, or Firm*—Evenson, McKeown, Edwards & Lenahan, P.L.L.C.

[57] ABSTRACT

A front end for an automobile with a supporting structure having a side member section and a wheel arch on both sides of the vehicle, as well as the plurality of reinforcing sections, with an integral support being connected from below to the supporting structure to receive parts of a front axle assembly, is provided. On each side of the vehicle, the wheel arch, the side member section, and at least partially the reinforcing sections are integrated into a one-piece stable wheel arch shell. The one-piece stable wheel arch shell is provided in the vicinity of its lower edge with a fold which is horizontal in a mounted state for connecting the integral support.

16 Claims, 2 Drawing Sheets

FRONT END FOR AN AUTOMOBILE WITH A SUPPORTING STRUCTURE

BACKGROUND AND SUMMARY OF THE INVENTION

The invention relates to a front end for an automobile with a supporting structure, which has a side member section and a wheel arch as well as a plurality of reinforcing sections for both sides of the vehicle, with an integral support for mounting parts of a front-wheel axle arrangement on the supporting structure from below.

A front end of this kind is known in Mercedes-Benz automobiles. A front end of this type has two side members composed of several parts. The members abut a firewall of the passenger compartment in their rear area. Along this side member, a wheel arch panel abuts upward on each side. The panel is connected at its rear area to the firewall. The two wheel arch panels are made with relatively thin walls and are appropriately strengthened in the area of the shock absorber mounts and in the area where various front axle parts are connected by additional reinforcing parts. An additional welded wheel arch reinforcement is provided in the upper area of the wheel arch panel, said reinforcement forming a second impact plane for a front-end impact, in addition to the side members.

German patent document DE 24 26 050 C2 describes a front end for an automobile having an underside to which a rectangular underframe, serving as an integral support for a drive assembly, is attached. The front end also has a reinforced wheel arch.

A front end for an automobile is also known from AT 187 433, said front end comprising a wheel arch in the form of a multipartite sheet metal structure. A box-shaped side member is formed on the underside of the wheel arch, said member being composed of a horizontal fold in the wheel arch and a side section shell mounted on the latter.

German patent document DE 29 44 538 A1 describes a front end for an automobile whose wheel arch is provided at its lower interior with a box-shaped reinforcement that is formed by a U-shaped supporting section that rests on the interior of the wheel arch.

A front end for a small automobile is also known from German patent document DE 285 316 A5. This front end is built without side members due to lack of space. Sufficient rigidity of the front end is provided by a sheet metal section system on both sides of the front end that is in the form of a closed box section. Requirements relating to safety engineering, especially as regards front end impact loads, cannot be handled by this front end.

The goal of the present invention is to provide a front end of the above-described type which firstly ensures a high safety standard and, secondly, is considerably easier to manufacture than by using known front end structures.

This goal is achieved by virtue of the fact that on each side of the vehicle, the wheel arch, the side member section, and at least partially, the reinforcing sections are integrated into a one-piece stable wheel arch which, in the vicinity of its lower edge, is provided with a fold, horizontal in the mounted state, for connecting the integral support. With the solution according to the present invention, a considerable reduction in the assembly cost is achieved while retaining the high safety standard provided in Mercedes-Benz automobiles.

The invention also provides a front end that is deformable in an improved manner in comparison with the prior art, despite the use of an integral support. In the prior art, the connection of an integral support to the two front end side members resulted in an extremely rigid block structure which, under certain conditions, could result in premature deformation of the passenger compartment. With the solution according to the present invention, on the other hand, the wheel arch shells form an inherently rigid main structure which takes up little space. The one-piece design of the wheel arch shells considerably reduces assembly and welding processes. The additional installation and mounting of reinforcing parts is largely reduced.

In one preferred embodiment of the present invention, the wheel arch shell has a wall thickness of more than 1.5 mm. The increased wall thickness produces the inherent rigidity of the wheel arch shell, with the total weight of the front end according to the invention approximately corresponding to the total weight of a known front end.

In another preferred embodiment of the invention, in the vicinity of the connecting points of the integral support to the fold of each wheel arch shell, a closing part is mounted to form a closed hollow section with the fold. As a result, a further increase in the rigidity of the wheel arch shell is achieved in the vicinity of the connecting points of the integral support.

In yet another preferred embodiment of the invention, a closing part is designed in an area of the wheel arch shell that is at the rear and abuts a firewall in such fashion that a funnel-shaped hollow section, expanded toward the firewall, is formed with the fold of the wheel arch shell. This produces a force-transmitting connection to the firewall.

In still yet another preferred embodiment of the invention, a closing part in a forward area of the wheel arch shell has connecting areas for a cross member provided with deformation elements. This makes it possible, with interposition of corresponding deformation elements, to locate a bumper bracket in front of the wheel arch shells.

In another preferred embodiment of the invention, the two wheel arch shells are provided with reinforcing ribs. This further increases the rigidity of the wheel arch shells.

In still yet another preferred embodiment of the invention, the two wheel arch shells are made of an alloy, in which mounts for mounting and fastening functional elements are integrally molded. The design according to the present invention for the front end allows the possibility of using alloys since a much smaller number of assembly steps must be performed to assemble the front end.

Other objects, advantages and novel features of the present invention will become apparent from the following detailed description of the invention when considered in conjunction with the accompanying drawings.

DETAILED DESCRIPTION OF THE DRAWINGS

Figure 1:
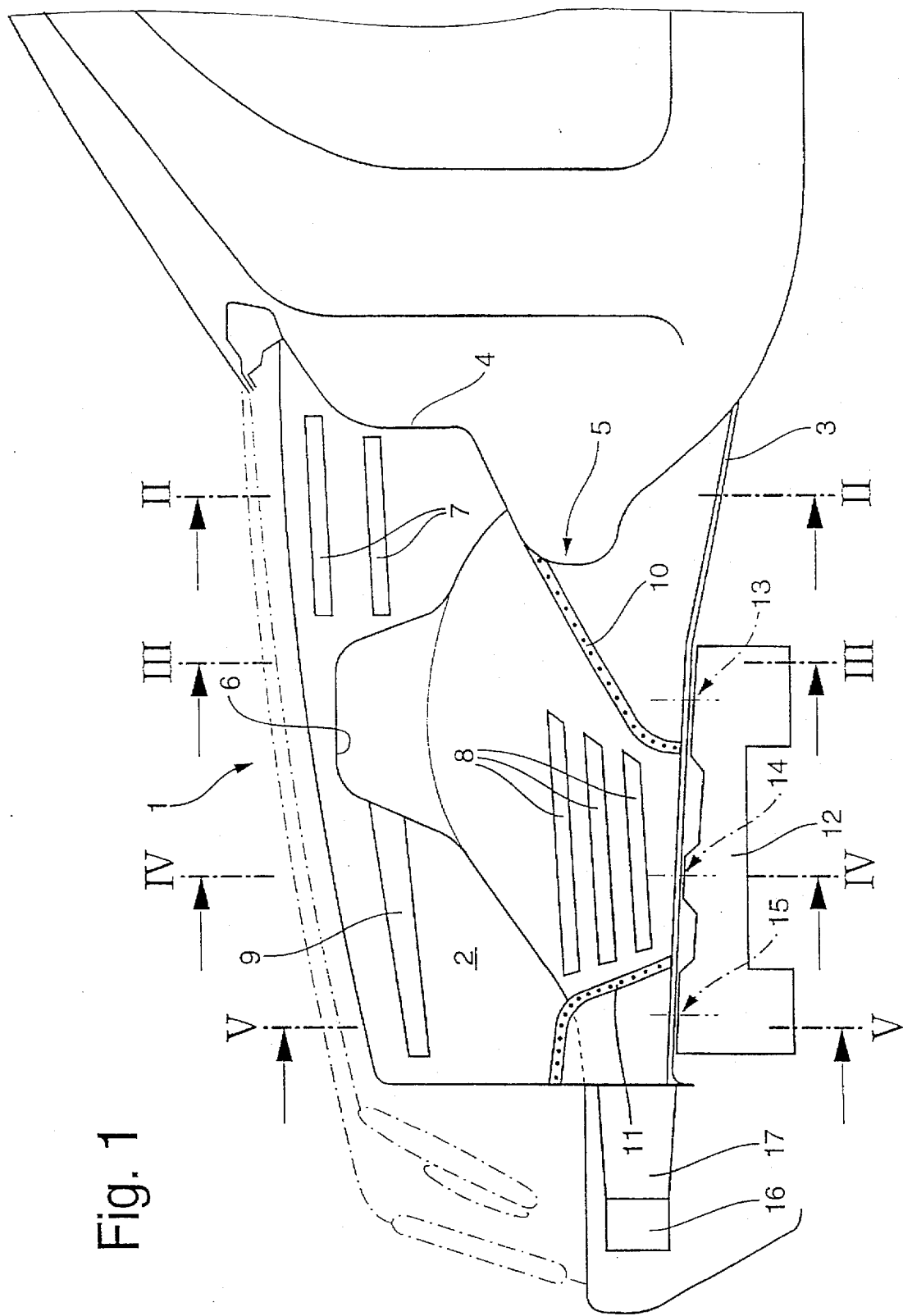
FIG. 1 shows, schematically, a side view of one embodiment of a front end according to the present invention, in which the one-piece wheel arch shell design is readily apparent.
Figure 2:
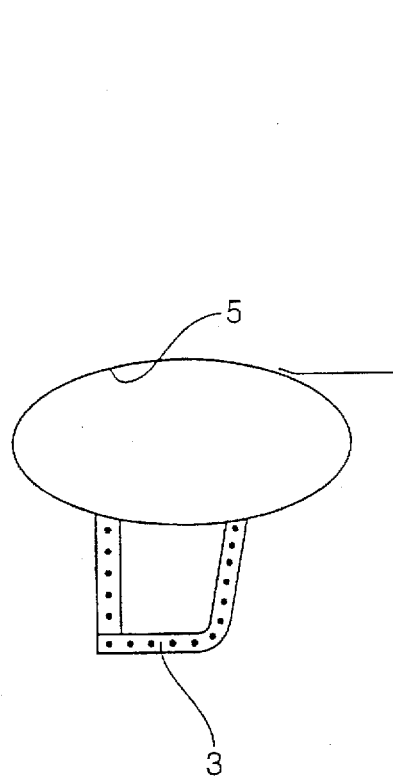
FIG. 2 is a section view through the left half (looking in the direction of travel) of the front end according to FIG. 1, taken along section line II—II in FIG. 1.

An automobile according to FIG. 1 has a front end (1) that abuts at the front of the passenger compartment of the automobile. Front end (1) has a rigid supporting structure to receive a front axle arrangement as well as a drive assembly and a plurality of additional functional elements. The front end (1) is deformable in an energy-absorbent fashion in the event of a front-end impact. The front end according to the invention shown in FIG. 1 eliminates conventional side member construction and instead, on each side, has a one-piece wheel arch shell (2) made of sheet metal with a wall thickness between 1.75 mm and 2.5 mm. The two wheel arch shells (2), one on each side of the front end (1), are identical to one another, but are designed to be mirror-symmetrical. Both a wheel arch and a side member section are integrated into each wheel arch shell (2). The wheel arch shells (2) extend over the entire length of the front end (1) and in their rear areas abut a firewall (4) of the passenger compartment. In their lower area, the wheel arch shells (2) are each provided with a fold (3) that extends horizontally inward, said folds likewise extending over the entire length of the wheel arch shells (2). On these folds (3), an integral support (12), known in and of itself, is bolted from below or mounted in another fashion. The support (12) serves in particular to mount parts of a front axle arrangement. Depending on the embodiment, the drive assembly for the motor vehicle is also mounted on the integral support (12).

Integral support (12) is connected on each side at three connecting points (13, 14, 15) with fold (3) of the respective wheel arch shells (2). The three connecting points (13, 14, 15) are thus located in a row along the fold (3) of each wheel arch shell (2) and are spaced apart.

An ellipsoid firewall with an increased sheet metal thickness is used as the firewall (4), said firewall having convex areas (5) projecting forward at the level of the two wheel arch shells (2). The two wheel arch shells (2) are welded to the firewall (4) over its entire height.

Figure 4:
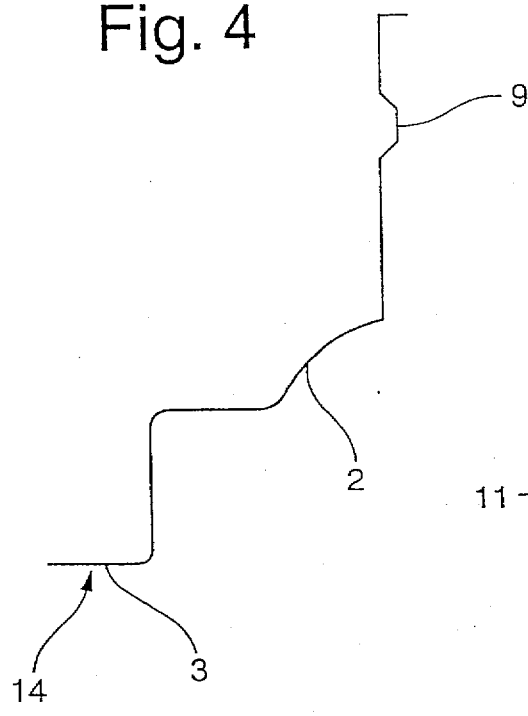
FIG. 4 is another section view taken along section line IV—IV in FIG. 1.
Figure 5:
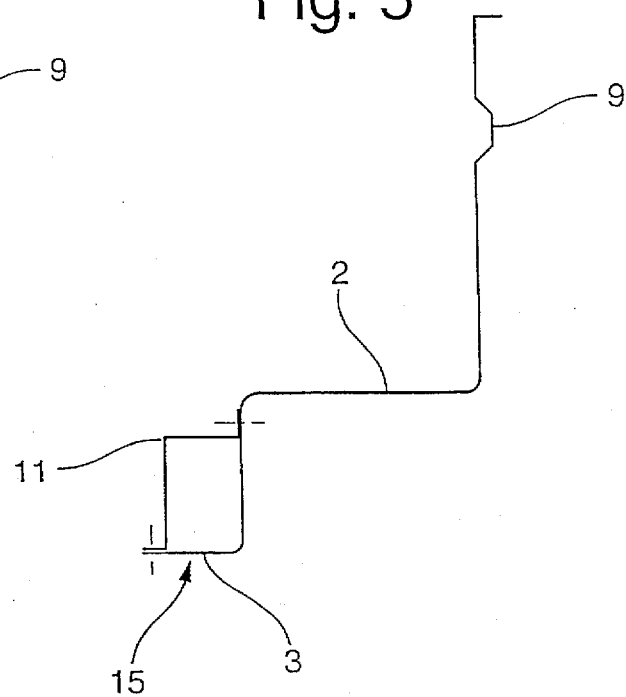
FIG. 5 is a section view through the wheel arch shell structure taken along section line V—V in FIG. 1.

The top edge of each wheel arch shell (2) extends from the firewall (4) approximately horizontally forward. The fender of the body can be bolted on in this area, and, because of the considerable sheet metal thickness of the wheel arch shell (2), reinforcing elements can be eliminated in the vicinity of the bolting points. Each wheel arch shell (2) has a central area that extends forward from the firewall (4), said central area being drawn inward transversely with respect to the direction of travel and constituting the wheel installation. At the level of a shock absorber mount, a shock absorber tower (6) is molded integrally in each wheel arch shell (2). This shock absorber tower (6) already possesses sufficient rigidity so that additional reinforcements can be eliminated in the vicinity of the shock absorber tower (6) as well. To reinforce the upper lengthwise area of the wheel arch shell (2), two reinforcing ribs (7) are provided between the firewall (4) and the shock absorber tower (6), said ribs running lengthwise in parallel to one another between the firewall (4) and the shock absorber tower (6). An additional reinforcing rib (9) is provided extending forward from the shock absorber tower (6). The wheel installation above the fold (3) has three reinforcing ribs (8) to indicate a side member section. These ribs cannot be seen in FIG. 4, however.

Figure 3:
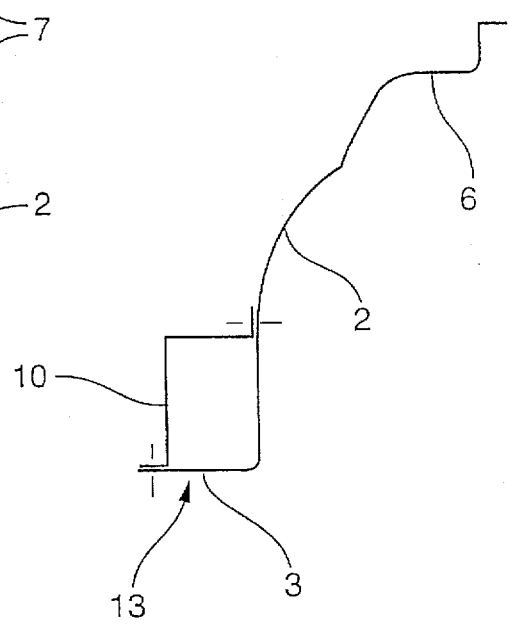
FIG. 3 is another section view similar to FIG. 2 but taken along section line III—III in FIG. 1.

In the vicinity of the rear connecting point (13) of the integral support (12), the fold (3) is supplemented by a closing panel (10) (FIG. 3) that forms a closed hollow section with the horizontal fold (3). As can be seen from FIG. 1, this closed hollow section expands toward the firewall (4) funnel-wise, so that a good transmission of force from loads on integral support (12) into the area of firewall (4) can take place. The hollow section formed by the closing panel (10) and the fold (3), in the event of a front end impact, also forms a deformation element that is located in front of the firewall (4) and absorbs energy.

In the vicinity of a front connecting point (15) of the integral support (12) at the fold (3) of each wheel arch shell (2), an additional closing part (11) is provided that contributes to reinforcement of each wheel arch shell (2) in the vicinity of the front integral support mount and also forms mounting and bolting surfaces for a bumper bracket (16) located in front of the wheel arch shells (2). Bumper bracket (16) is designed as a cross member and is bolted endwise to the wheel arch shells (2) with the interposition of deformation elements (17). Welding of the front closing part (11) can be performed using a jig so that tolerances transverse to the lengthwise direction of the vehicle can be compensated. The rigidity of the front end is achieved in the solution according to the present invention not by the wheel arch shells (2) alone but only with the additional solid connection of the integral support (12) from below to the two wheel arch shells (2). Integral support (12) is then preferably bolted to the folds (3).

In an embodiment of the invention that is not shown, the one-piece wheel arch shells (2) are manufactured from alloy as castings, with said castings being made rigid by suitable ribs and variations in wall thickness at suitable points. Advantageously, mounts and fastening points for functional elements of the automobile are integrated into these wheel arch shells. In the alloy version of the wheel arch shells, the closing parts can be eliminated. In these areas, it is merely necessary to integrate suitable reinforcing measures such as ribs or the like in order to achieve sufficient rigidity. As a result, the entire supporting front end structure is provided only by the one-piece wheel arch shells.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A front end for an automobile with a supporting structure having a side member section and a wheel arch on both sides of said automobile, as well as a plurality of reinforcing sections, with an integral support being connected to the supporting structure from below in order to receive parts of a front axle assembly, wherein on each side of said automobile, said wheel arch, said side member section, and at least partially said plurality of reinforcing sections are formed integrally as a one-piece stable wheel arch shell, said one-piece stable wheel arch shell having a fold in a vicinity of its lower edge, said fold being horizontally arranged in a mounted state and being directly connected to said integral support.

2. The front end according to claim 1, wherein said one-piece stable wheel arch shell has a wall thickness of more than 1.5 mm.

3. The front end according to claim 2, wherein in a vicinity of connecting points of said integral support on said fold of each wheel arch shell, at least one closing part is provided to form a closed hollow section with said fold.

4. The front end according to claim 3, wherein a first of said at least one closing part is provided in a rear area of said wheel arch shell which abuts a firewall such that a hollow section is formed between said closing part and said fold, said hollow section expanding in a funnel-shape toward said firewall.

5. The front end according to claim 4, wherein a second closing part is arranged in a forward area of said wheel arch shell and has connecting surfaces, further comprising a cross member provided with deformation elements, said cross member being mounted to said connecting surfaces.

6. The front end according to claim 1, wherein said wheel arch shells are provided with reinforcing ribs.

7. The front end according to claim 2, wherein said wheel arch shells are provided with reinforcing ribs.

8. The front end according to claim 3, wherein said wheel arch shells are provided with reinforcing ribs.

9. The front end according to claim 4, wherein said wheel arch shells are provided with reinforcing ribs.

10. The front end according to claim 5, wherein said wheel arch shells are provided with reinforcing ribs.

11. The front end according to claim 1, wherein said wheel arch shells are formed of an alloy, on which mounts for mounting and fastening functional elements are integrally formed.

12. The front end according to claim 2, wherein said wheel arch shells are formed of an alloy, on which mounts for mounting and fastening functional elements are integrally formed.

13. The front end according to claim 3, wherein said wheel arch shells are formed of an alloy, on which mounts for mounting and fastening functional elements are integrally formed.

14. The front end according to claim 4, wherein said wheel arch shells are formed of an alloy, on which mounts for mounting and fastening functional elements are integrally formed.

15. The front end according to claim 5, wherein said wheel arch shells are formed of an alloy, on which mounts for mounting and fastening functional elements are integrally formed.

16. The front end according to claim 6, wherein said wheel arch shells are formed of an alloy, on which mounts for mounting and fastening functional elements are integrally formed.

* * * * *